US008139168B2

(12) United States Patent
Kim

(10) Patent No.: US 8,139,168 B2
(45) Date of Patent: Mar. 20, 2012

(54) DISPLAY DEVICE USING LCD PANEL AND A METHOD OF EXECUTING TIMING CONTROL OPTIONS THEREOF

(75) Inventor: Yong-hyun Kim, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1292 days.

(21) Appl. No.: 11/516,615

(22) Filed: Sep. 7, 2006

(65) Prior Publication Data

US 2007/0075946 A1 Apr. 5, 2007

(30) Foreign Application Priority Data

Oct. 4, 2005 (KR) ........................ 10-2005-0093059

(51) Int. Cl.
*H04N 3/14* (2006.01)

(52) U.S. Cl. .......... 348/790; 348/792; 348/785; 345/99; 345/87

(58) Field of Classification Search .................. 348/792, 348/790, 785; 345/99, 87, 77, 63
See application file for complete search history.

(56) References Cited

U.S. PATENT DOCUMENTS 6,778,170 B1 8/2004 Shu et al.
7,535,452 B2 * 5/2009 Kang et al. ........................ 345/99
7,782,345 B2 * 8/2010 Evanicky et al. ............. 345/690
2005/0052440 A1 3/2005 Kim et al.

FOREIGN PATENT DOCUMENTS

CN 1658268 8/2005
JP 2004-246093 9/2004
KR 2002-0013009 2/2002

OTHER PUBLICATIONS

Chinese Office Action dated Jun. 6, 2008 issued in CN 2006-10141606.2.

* cited by examiner

*Primary Examiner* — Jefferey Harold
*Assistant Examiner* — Jean W Desir
(74) *Attorney, Agent, or Firm* — Stanzione & Kim, LLP

(57) ABSTRACT

A display device including a liquid crystal display (LCD) panel includes a driving circuit unit to drive the LCD panel, a main controller to generate a data signal that includes predetermined option information, and a timing controller,to detect the option information upon receiving the data signal from the main controller and to adjust an operation state of the LCD panel by transmitting a predetermined operation signal corresponding to the option information to the driving circuit unit. The main controller transmits a color data signal, a V-sync signal, an H-sync signal, a clock signal, and a data enable signal, as the data signal. The option information can be recorded on the data enable signal to change the option information.

20 Claims, 4 Drawing Sheets

DISPLAY DEVICE USING LCD PANEL AND A METHOD OF EXECUTING TIMING CONTROL OPTIONS THEREOF

CROSS-REFERENCE TO RELATED APPLICATIONS

This application claims priority under 35 U.S.C. §119(a) from Korean Patent Application No. 2005-93059 filed on Oct. 4, 2005, in the Korean Intellectual Property Office, the disclosure of which is hereby incorporated by reference in its entirety.

BACKGROUND OF THE INVENTION

1. Field of the Invention

The present general inventive concept relates to a display device using a liquid crystal display (LCD) panel and a method to execute a timing control option thereof. More particularly, the present general inventive concept relates to a display device to control a driving timing of an LCD panel according to predetermined option information, and a method of executing a timing control option thereof.

2. Description of the Related Art

A variety of display devices have been developed according to advances in electronic technology. One of such display devices utilizes a liquid crystal display (LCD) panel. The display device using the LCD panel enables a considerably-reduced size in comparison with a cathode-ray tube (CRT) and also enables high definition technology.

The LCD display device displays desired data by converting input digital data of respective pixels to analog data through a driver integrated circuit (IC) and transmitting the converted data line by line to an LCD panel. For these processes, an operation signal for driving the driver IC is required. A timing controller generates the operation signal.

The timing controller used in a conventional LCD display device executes predetermined options, for example, gamma compensation, voltage common (Vcom) compensation, and dithering. Option information is necessary for the timing controller to execute the options. The option information is stored in a dedicated memory, such as an erasable programmable read only memory (EPROM).

Accordingly, the conventional LCD display device is configured to operate in a manner such that the timing controller reads the option information from the memory and executes the options. The option information may be set randomly and stored by a manufacturer of the LCD display device.

However, after the LCD display device is distributed through the market, attributes of the LCD may be changed according to an operation environment and usage. Accordingly, patterns of the operation signal supplied to the drive IC by the timing controller may be changed when executing the respective options. Nevertheless, the option information of the conventional LCD is fixedly stored in the memory. In other words, since the option information is unchangeable, appropriate option information for current conditions of the LCD cannot be used. As a result, image quality may be deteriorated.

SUMMARY OF THE INVENTION

The present general inventive concept solves at least the above problems and/or disadvantages, and provides at least the advantages described below.

The present general inventive concept provides a display device to flexibly-apply option information that includes a timing controller to execute a timing control option by receiving the option information from a main controller, and a method of executing the timing control option thereof.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a display device including a liquid crystal display panel, the display device including a driving circuit unit to drive the liquid crystal display panel, a main controller to generate a data signal that includes predetermined option information, and a timing controller to detect the option information of the data signal received from the main controller, and to adjust an operation state of the liquid crystal display panel by transmitting a predetermined operation signal corresponding to the option information to the driving circuit unit.

The display device may further include an option information reception unit to receive the option information and to supply the option information to the main controller.

The driving circuit unit may include a gate driver integrated circuit to transmit a first operation signal to a gate terminal of the liquid crystal display panel, and a data driver integrated circuit to transmit a second operation signal to a source terminal of the liquid crystal display panel.

The main controller may transmit a color data signal, a vertical synchronization signal, a horizontal synchronization signal, a clock signal, and a data enable signal, as the data signal, and records the option information on the data enable signal.

The timing controller may recognize data recorded in a data enable signal section of the data enable signal corresponding to a blanking section of the vertical synchronization signal as the option information.

The timing controller may recognize the data recorded in the data enable signal as the option information when the vertical synchronization signal is a negative synchronization signal and when the data enable signal is high at a moment of detecting a rising edge of the vertical synchronization signal and a rising edge of the clock signal.

The timing controller may recognize the data recorded in the data enable signal as the option information when the vertical synchronization signal is a positive synchronization signal and when the data enable signal is high at a moment of detecting a falling edge of the vertical synchronization signal and a rising edge of the clock signal.

The option information may be data for executing at least one of a gamma compensation option, a voltage common compensation option, and a dithering option.

The display device may further include an option information reception unit to receive a signal representing the option information from an external device, in which the main controller generates the data signal according to the option information received from the option information reception unit. The external device may include a personal computer to output data such that the driving circuit drives the liquid crystal display panel to display an image according to the data. The driving circuit may drive the liquid crystal display panel to display an image according to image data of the data signal according to the operation signal. The option information may include a timing control signal to control an operating state of pixels of the liquid crystal display panel.

The data signal may include a vertical synchronization signal and a data enable signal. The main controller may transmit the data signal including the timing control option information to the timing controller on the data enable signal. The main controller may transmit the data signal including the timing control option information to the timing controller on a section of the data enable signal corresponding to a blanking section of the vertical synchronization signal. The timing control option information may include information to execute at least one of a gamma compensation option, a voltage common compensation option, and a dithering option. The display device may further include an updatable memory unit to store the timing control option information and to transmit the timing control option information to the main controller.

The foregoing and/or other aspects and utilities of the present general inventive concept may also be achieved by providing a method of executing timing control options of a display device including a liquid crystal display panel, a gate driver integrated circuit to transmit operation signal to a gate terminal of the liquid crystal display panel, a data driver integrated circuit to transmit an operation signal to a source terminal of the liquid crystal display panel, and a timing controller to drive the gate driver integrated circuit and the data driver integrated circuit, the method including generating a data signal including a predetermined option information, receiving the data signal and detecting the option information at the timing controller, and transmitting a predetermined operation signal corresponding to the option information from the timing controller to the gate driver integrated circuit and the data driver integrated circuit and to adjust the driving state of the liquid crystal display panel.

The data signal may include a color data signal, a vertical synchronization signal, an horizontal synchronization signal, a clock signal, and a data enable signal.

The transmitting of the predetermined operation signal may include determining whether a rising edge of the vertical synchronization signal is generated when the vertical synchronization signal is a negative synchronization signal; determining whether a rising edge of the clock signal is generated when the rising edge of the vertical synchronization signal is detected; checking the data enable signal when the rising edge of the clock signal is detected; and recognizing data recorded in the data enable signal as the option information when the data enable signal is high.

The transmitting of the predetermined operation signal may include determining whether a falling edge of the vertical synchronization signal is generated when the vertical synchronization signal is a positive synchronization signal, determining whether a rising edge of the clock signal is generated when the falling edge of the vertical synchronization signal is detected, checking the data enable signal when the rising edge of the clock signal is detected, and recognizing data recorded in the data enable signal as the option information when the data enable signal is high.

The option information may be data to execute at least one of a gamma compensation option, a voltage common compensation option, and a dithering option.

The foregoing and/or other aspects and utilities of the present general inventive concept may also be achieved by providing a display device, including a driving circuit unit to convert input digital data to analog data, a timing controller to transmit a predefined operation signal based on timing control option information to the driving circuit unit, a main controller to transmit a data signal including the timing control option information to the timing controller and to update the timing control option information, and a display panel to display an image corresponding to the analog data.

The foregoing and/or other aspects and utilities of the present general inventive concept may also be achieved by providing a display device, including a main controller to generate a data signal having image data and option information, a timing controller to generate a first operation signal and a second operation signal according to the image data and the option information of the data signal, respectively, a display panel, and a driving circuit to control the display panel to display an image according to the first and second operation signals.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
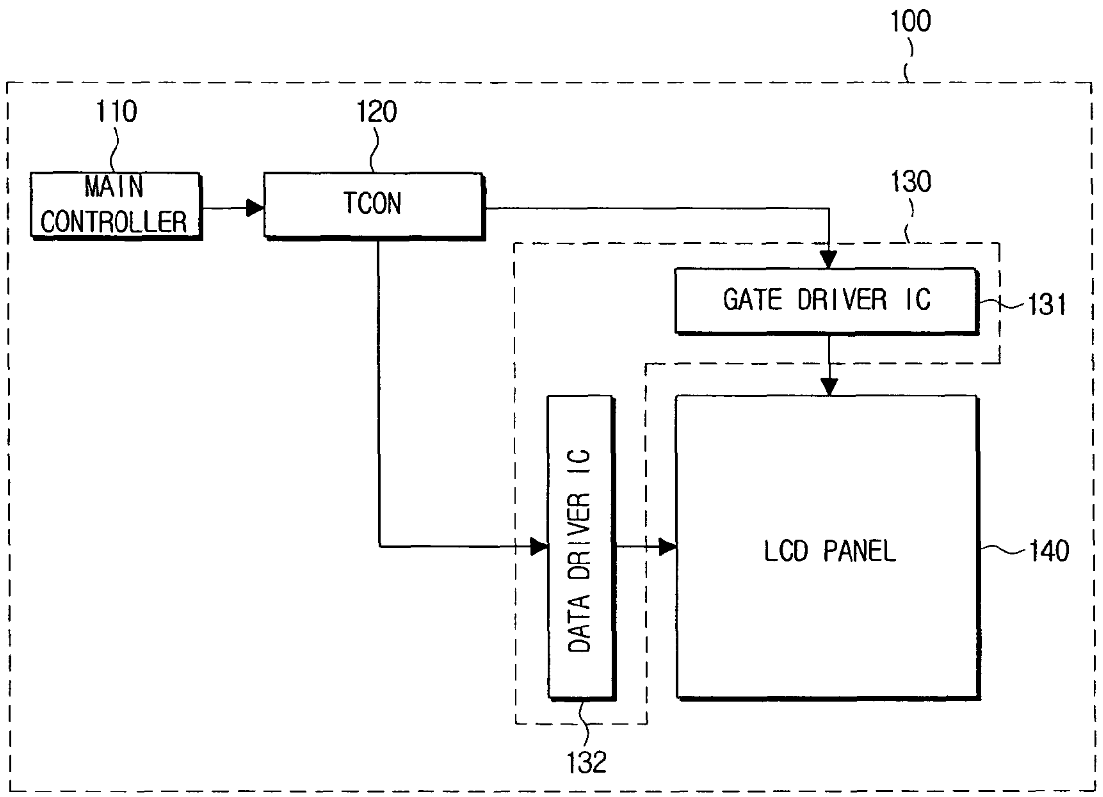
FIG. 1 is a block diagram illustrating a structure of a display device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a structure of a display device 100 according to an embodiment of the present general inventive concept. Referring to FIG. 1, the display device 100 may include a main controller 110, a timing controller (TCON) 120, a driving circuit unit 130, and a liquid crystal display (LCD) panel 140.

The driving circuit unit 130 may include a gate driver integrated circuit (IC) 131 and a data driver IC 132. The gate driver IC 131 may sequentially-select a gate terminal of thin-film transistors (TFT) in the LCD panel 140 and may input a scanning signal thereto. The data driver IC 132 converts digital data corresponding to image information to a pixel voltage and inputs the pixel voltage in a data terminal, that is, a source terminal of the TFTs. The data driver IC 132 can also be referred to as a source driver IC because it drives the source terminal of the TFTs. The LCD panel 140 is driven by the gate driver IC 131 and the data driver IC 132 to display an image thereon.

The timing controller 120 transmits a predetermined operation signal to the driving circuit unit 130 to drive the gate driver IC 131 and the data driver IC 132.

The main controller 110 transmits a data signal to the timing controller 120. The data signals may include a color data signal, a vertical synchronization (V-sync) signal, a horizontal synchronization (H-sync) signal, a clock signal, and a data enable signal. The data signal may be transmitted using a low-voltage differential signaling (LVDS) method. The LVDS refers to a method of transmitting digital information at high speed through a copper wire to a flat panel display using 3.3V or 1.5V instead of a standard voltage 5V. The main controller 110 may also include a scaler (not illustrated) to perform scaling of the data signal.

The option information may be loaded on the data enable signal. More specifically, the option information can be supplied to the timing controller 120 by being loaded on a data enable signal section corresponding to a blanking section of the V-sync signal. The option information may include, for example, data to execute a gamma compensation option, data to execute a Vcom compensation option, and/or data to execute a dithering option.

The gamma compensation option refers to a compensation operation to implement original brightness by adjusting a gamma value, which is a reference value used to measure medium brightness of a screen. The Vcom compensation option refers to an operation to compensate for a flicker phenomenon caused by a transmittance difference between even-numbered frames and odd-numbered frames. The dithering option refers to an operation to generate a certain color similar to a desired color by mixing several available colors when the desired color is not available. The option information may include data required to execute one or more of the above various options.

The timing controller 120 detects the option information supplied from the main controller 110 to execute the various timing control options using the option information. Specifically, the timing controller 120 executes the various options, such as gamma compensation, Vcom compensation, and dithering, at the LCD panel 140 by adjusting operation signal patterns transmitted to the gate driver IC 131 and the data driver IC 132 in accordance with the option information.

The main controller 110 periodically updates the option information based on one or more current conditions of the display device 100, and supplies the updated option information to the timing controller 120.

Figure 2:
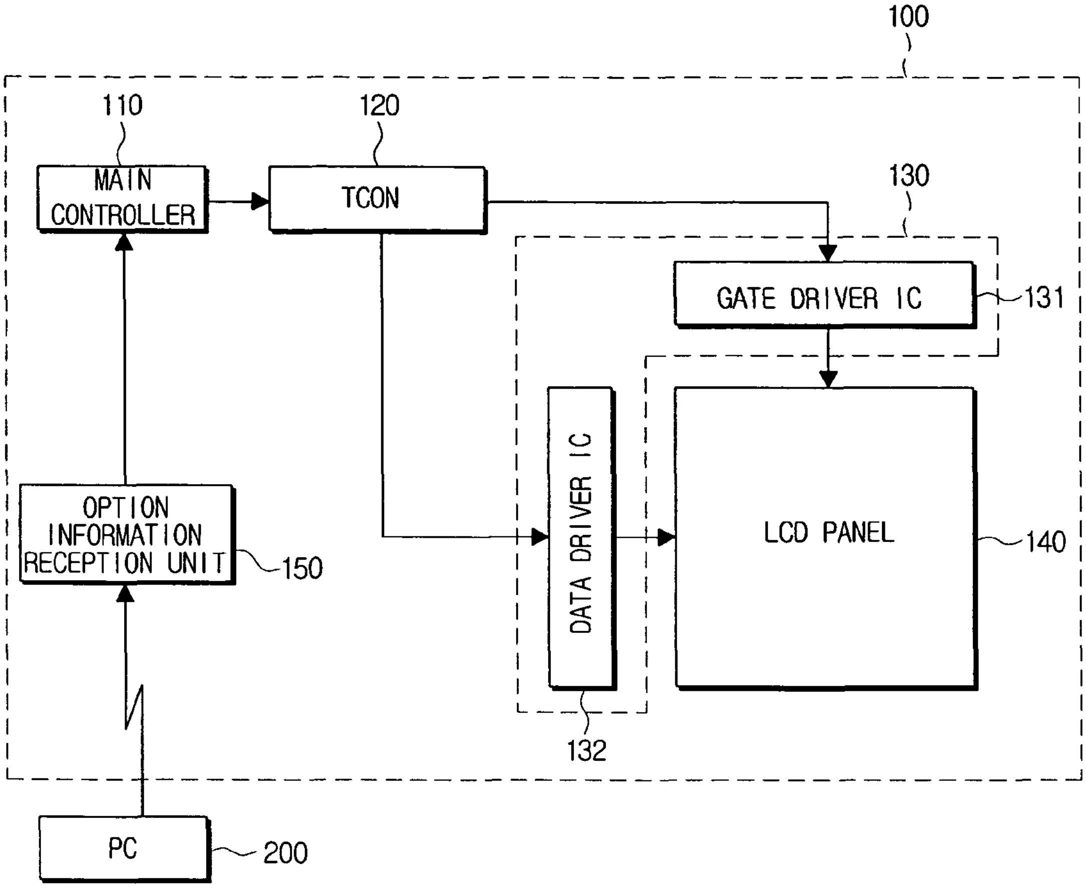
FIG. 2 is a block diagram illustrating a structure of a display device according to an embodiment of the present general inventive concept.

FIG. 2 is a block diagram illustrating a structure of a display device 100 according to an embodiment of the present general inventive concept. Referring to FIGS. 1 and 2, the display device 100 includes the main controller 110, the timing controller 120, the driving circuit unit 130 and the LCD panel 140, and an option information reception unit 150.

The option information reception unit 150 may receive the option information from an external device, such as a personal computer (PC) 200. For example, the option information reception unit 150 may receive the option information set by a video graphics array (VGA) card in the PC 200 in accordance with display data channel (DDC) standards. The DDC standards refer to standards defined by Video Electronics Standards Association (VESA) regarding data communication between the VGA card and the display device 100. The DDC standards mainly include DDC1 and DDC2. DDC1 is a standard set to attain an optimum image quality and relates to a manner in which the VGA card refers to information on the display device 100. The DDC2 is a standard set such that the VGA card is capable of setting new information appropriate to the display device 100 by reading and recognizing the information on the display device 100.

The main controller 110 is capable of transmitting the option information received through the option information reception unit 150 to the timing controller 120 by loading the option information on the data enable signal.

Figure 3:
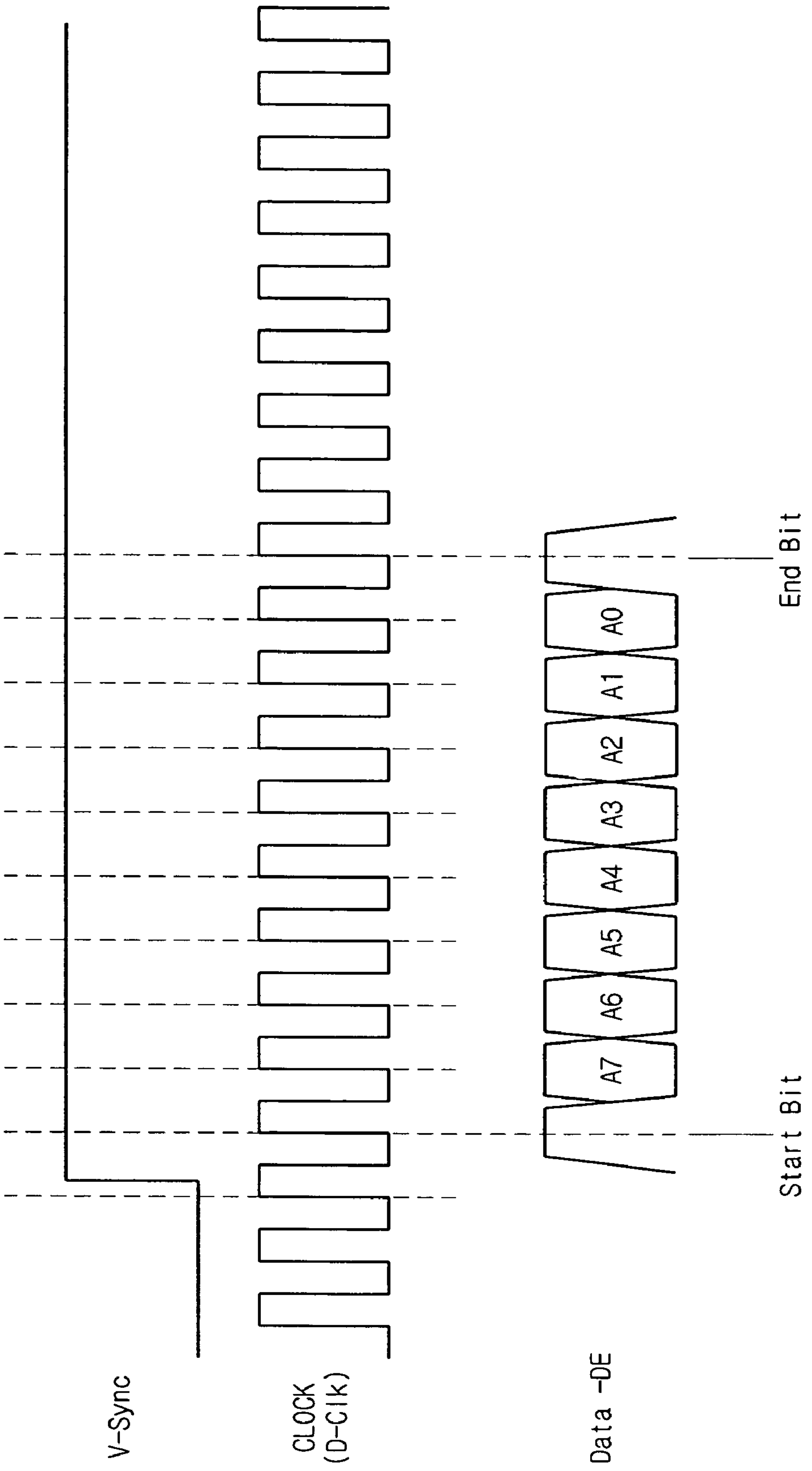
FIG. 3 is a view illustrating an example of a data signal to supply option information from a display device to a timing controller according to an embodiment of the present general inventive concept.

FIG. 3 is a view illustrating an example of a data signal to supply option information from a display device to a timing controller according to an embodiment of the present general inventive concept. Referring to FIGS. 1-3, the V-sync signal is in the form of a negative synchronization signal. At a time point when a rising edge is generated on the V-sync signal, the timing controller 120 determines that a blanking section of the V-sync signal starts from the time point. The clock signal (D-Clk) is checked when the blanking section is determined. When the rising edge of the clock signal is recognized, in other words, when a first clock is input, a value of the data enable signal (Data -DE) being input at that moment is checked.

As illustrated in FIG. 3, when the data enable signal value is high at the moment of recognizing the rising edge of the V-sync signal and the rising edge of the clock signal, the timing controller 120 determines that transmission of the option information starts (Start Bit). Therefore, the data being input from the Start Bit until an End Bit is input is detected as the option information. In FIG. 3, the option information is implemented by 8-bit data (A0 to A7), and the final end bit is high. The timing controller 120 analyzes the option information input in this section and executes the corresponding options.

When the V-sync signal is a positive synchronization signal, whether the option information is transmitted can be determined by checking the data enable signal value in the first clock after a falling edge of the V-sync signal is recognized. In other words, when the data enable signal is high at the moment of recognizing the falling edge of the V-sync signal and the rising edge of the clock signal, the timing controller 120 detects data being input from the time point as the option information and executes the corresponding options.

Figure 4:
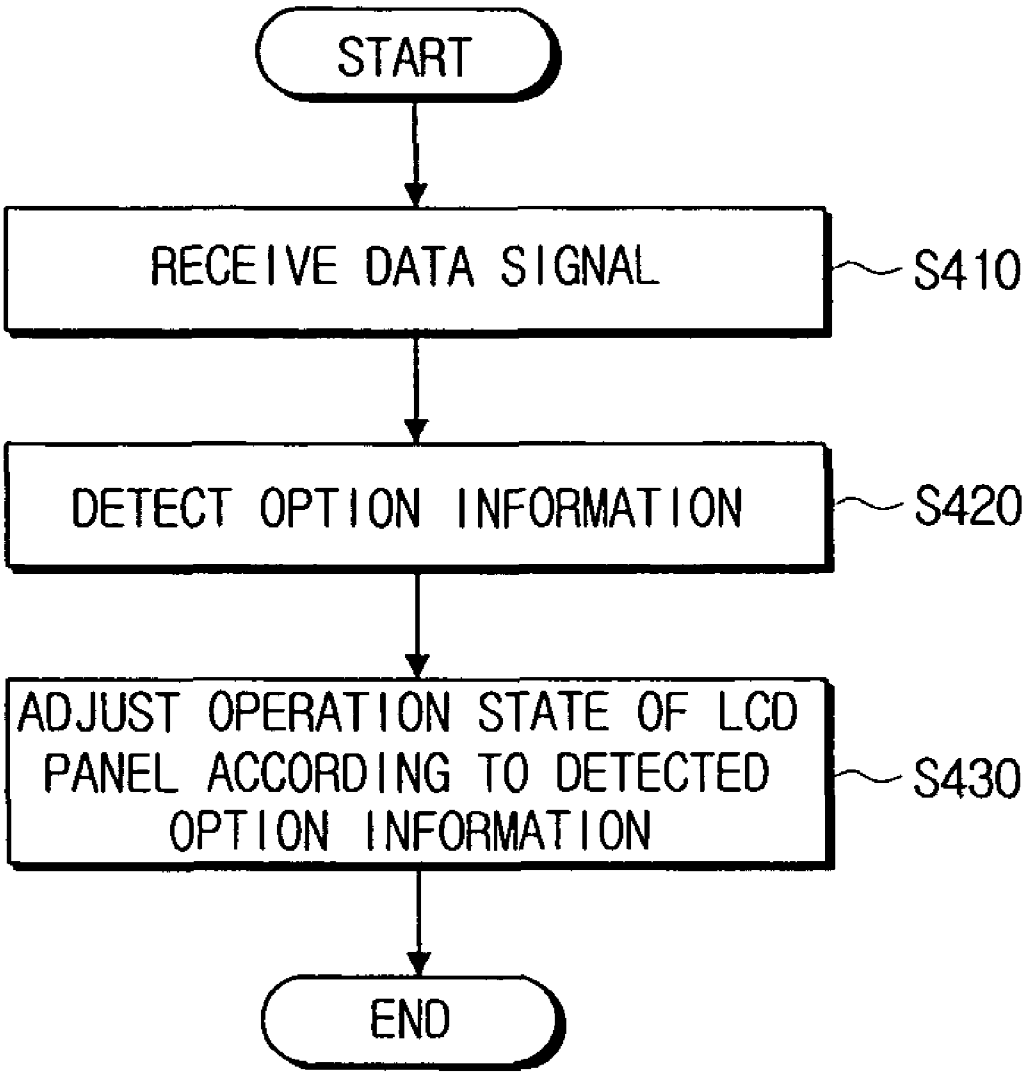
FIG. 4 is a flowchart illustrating a method of executing one or more timing control options in a display device according to an embodiment of the present general inventive concept.

FIG. 4 is a flowchart illustrating a method of executing one or more timing control options in a display device according to an embodiment of the present general inventive concept. According to FIG. 4, upon reception of a data signal including a V-sync signal, a clock signal, and a data enable signal at operation S410, a timing controller detects option information included in the data signal at operation S420. As aforementioned, the option information may be loaded on a data enable signal section of the data enable signal, which is input during a blanking section of the V-sync signal.

Accordingly, an operation state of an LCD panel is adjusted using the detected option information at operation S430. Specifically, the timing control options, such as gamma compensation, Vcom compensation, and dithering, can be executed.

In various embodiments of the present general inventive concept, option information can be transmitted from a main controller on demand so that corresponding options can be executed. Therefore, the option information can be changed rather than be fixedly stored in a memory. As a result, the option information can be changed according to a current condition of a display device, thereby maintaining optimum image quality.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display device including a liquid crystal display panel, comprising:

a driving circuit unit to drive the liquid crystal display panel;

a main controller to generate a data signal that includes image data to generate an image and predetermined option information to modify the image generated by the image data, wherein the option information is recorded on a data enable signal of the data signal; and a timing controller to detect the option information of the data signal received from the main controller, and to adjust an operation state of the liquid crystal display panel by transmitting a predetermined operation signal corresponding to the option information to the driving circuit unit, wherein the option information is data for executing at least one of a gamma compensation option, a voltage common compensation option, and a dithering option, the voltage common compensation option being defined as an operation to compensate for a flicker phenomenon.

2. The display device of claim 1, further comprising:

an option information reception unit to receive the option information and to supply the option information to the main controller.

3. The display device of claim 1, wherein the driving circuit unit comprises:

a gate driver integrated circuit to transmit a first operation signal to a gate terminal of the liquid crystal display panel; and a data driver integrated circuit to transmit a second operation signal to a source terminal of the liquid crystal display panel.

4. The display device of claim 1, wherein the main controller transmits a color data signal, a vertical synchronization signal, a horizontal synchronization signal, a clock signal, and the data enable signal, as the data signal.

5. The display device of claim 4, wherein the timing controller recognizes data recorded in a data enable signal section of the data enable signal corresponding to a blanking section of the vertical synchronization signal as the option information.

6. The display device of claim 5, wherein the timing controller recognizes the data recorded in the data enable signal as the option information when the vertical synchronization signal is a negative synchronization signal and when the data enable signal is high at a moment of detecting a rising edge of the vertical synchronization signal and a rising edge of the clock signal.

7. The display device of claim 5, wherein the timing controller recognizes the data recorded in the data enable signal as the option information when the vertical synchronization signal is a positive synchronization signal and when the data enable signal is high at a moment of detecting a falling edge of the vertical synchronization signal and a rising edge of the clock signal.

8. The display device of claim 1, further comprising:

an option information reception unit to receive a signal representing the option information from an external device, wherein the main controller generates the data signal according to the option information received from the option information reception unit.

9. The display device of claim 8, wherein the external device comprises a personal computer to output data such that the driving circuit drives the liquid crystal display panel to display an image according to the data.

10. The display device of claim 8, wherein the driving circuit drives the liquid crystal display panel to display an image according to image data of the data signal according to the operation signal.

11. The display device of claim 8, wherein the option information comprises a timing control signal to control an operating state of pixels of the liquid crystal display panel.

12. The display device of claim 1, wherein the data signal includes a vertical synchronization signal and a data enable signal.

13. The display device of claim 12, wherein the main controller transmits the data signal including the option information to the timing controller on the data enable signal.

14. The display device of claim 12, wherein the main controller transmits the data signal including the option information to the timing controller on a section of the data enable signal corresponding to a blanking section of the vertical synchronization signal.

15. The display device of claim 1, further comprising:

an updatable memory unit to store the option information and to transmit the timing control option information to the main controller.

16. A method of executing timing control options of a display device comprising a liquid crystal display panel, a gate driver integrated circuit to transmit operation signal to a gate terminal of the liquid crystal display panel, a data driver integrated circuit to transmit an operation signal to a source terminal of the liquid crystal display panel, and a timing controller to drive the gate driver integrated circuit and the data driver integrated circuit, the method comprising:

generating a data signal including image data to generate an image and a predetermined option information to modify the image generated by the image data, wherein the option information is recorded on a data enable signal of the data signal;

receiving the data signal and detecting the option information at the timing controller; and transmitting a predetermined operation signal corresponding to the option information from the timing controller to the gate driver integrated circuit and the data driver integrated circuit and to adjust the driving state of the liquid crystal display panel, wherein the option information is data to execute at least one of a gamma compensation option, a dithering option, and a voltage common compensation option, the voltage common compensation option being defined as an operation to compensate for a flicker phenomenon.

17. The method of claim 16, wherein the data signal comprises a color data signal, a vertical synchronization signal, an horizontal synchronization signal, a clock signal, and the data enable signal.

18. The method of claim 17, wherein the transmitting of the predetermined operation signal comprises:

determining whether a rising edge of the vertical synchronization signal is generated when the vertical synchronization signal is a negative synchronization signal;

determining whether a rising edge of the clock signal is generated when the rising edge of the vertical synchronization signal is detected;

checking the data enable signal when the rising edge of the clock signal is detected; and recognizing data recorded in the data enable signal as the option information when the data enable signal is high.

19. The method of claim 17, wherein the transmitting of the predetermined operation signal comprises:

determining whether a falling edge of the vertical synchronization signal is generated when the vertical synchronization signal is a positive synchronization signal;

determining whether a rising edge of the clock signal is generated when the falling edge of the vertical synchronization signal is detected;

checking the data enable signal when the rising edge of the clock signal is detected; and recognizing data recorded in the data enable signal as the option information when the data enable signal is high.

20. A display device, comprising:

a main controller to generate a data signal having image data to generate an image and option information to modify the image generated by the image data, wherein the option information is recorded on a data enable signal of the data signal;

a timing controller to generate a first operation signal and a second operation signal according to the image data and the option information of the data signal, respectively;

a display panel; and a driving circuit to control the display panel to display an image according to the first and second operation signals, wherein the option information is data to execute at least one of a gamma compensation option, a dithering option, and a voltage common compensation option, the voltage common compensation option being defined as an operation to compensate for a flicker phenomenon.

* * * * *